United States Patent Office 3,541,393
Patented Nov. 17, 1970

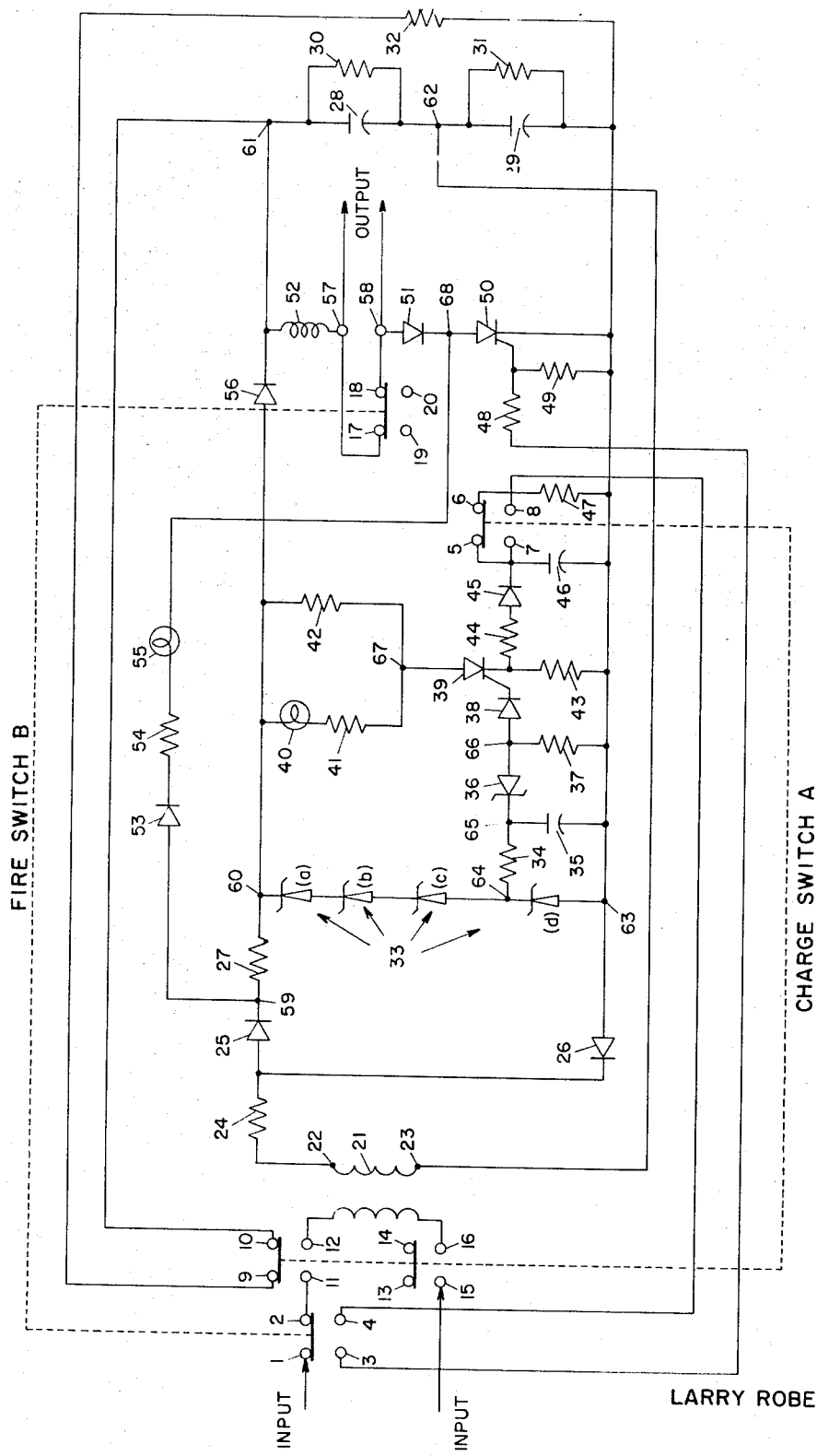

3,541,393
HIGH ENERGY SOLID STATE BLASTING MACHINE
Larry Robert Diswood, Ulster Park, N.Y., assignor to Hercules Incorporated, Wilmington, Del., a corporation of Delaware
Filed May 29, 1969, Ser. No. 828,916
Int. Cl. F23g 7/02; F42c 11/06
U.S. Cl. 317—80                        4 Claims

ABSTRACT OF THE DISCLOSURE

A high energy solid state blasting machine is provided for providing current to large numbers of blasting caps. The blasting machine employs a combination of Zener diodes and silicon control rectifiers to achieve a highly reliable and safe blasting machine.

---

This invention relates to a high energy condenser-type solid state blasting machine capable of initiating single or large numbers of electric detonators such as are employed in blasting caps. More particularly, this invention relates to a multiple shot blasting machine for use in tunnel blasting.

In recent years the principal method of detonating electric initiators of explosive devices has been by electromechanical means, using straight 220-volt A.C. or 440-volt A.C. with time limit actuators. With these devices, it is very difficult to detonate single or small numbers of electric initiators in blasting caps due to difficulty in controlling the time in which firing voltage is applied to the initiators. The time limitation of power application depends upon the mechanical design of the switch, i.e., how fast the switch can be opened or closed. If, for example, the switch is closed for too long a time, excessive current passes through the initiator which often cause hangfires.

It is an object of this invention to provide an improved condenser-type blasting machine which is capable of detonating single electrical initiators or large numbers of electrical initiators utilizing solid state devices and in particular utilizing silicon control rectifiers and Zener diodes. It is another object of this invention to provide a blasting machine which is durable, simple to operate, and safe. Other objects, advantages, and safety features of this invention will become apparent from the following detailed description.

Broadly described, the blasting machine of this invention comprises an A.C. power input, a voltage multiplying means connected to the power input, a charging switch and a firing switch, said A.C. power input being connected to the charging switch when the charging switch is closed and the firing switch is open. Two semiconductor diodes of opposite conductivity are each connected to the output of the voltage multiplying means. A first and a second capacitor are connected in series with the semiconductor diodes, each semiconductor diode is connected to one of the capacitors so that one capacitor becomes positively charged and one negatively charged with respect to a common connection thereby doubling the voltage across the first and second capacitors. A first solid state voltage control circuit is connected in parallel with the first and second capacitors. This solid state voltage control circuit has a breakdown and holding voltage equal to the charged voltage on the first and second capacitors. Thus, the voltage to which the first and second capacitors are charged depends upon the breakdown and holding voltage of the first voltage control circuit. A third capacitor is connected in series to the output from the first voltage control circuit, and to a second voltage control circuit having a breakdown voltage sufficient to provide current to the gate of a first silicon control rectifier which controls a ready circuit and charges a fourth capacitor. The fourth capacitor is connected through the open firing switch to the gate of a second silicon control rectifier in the firing circuit.

A firing circuit is connected in parallel with the first and second capacitors. This firing circuit comprises an inductor, two firing output terminals, a shorting bar connected across the output terminals and a second silicon control rectifier one lead of which is connected through a blocking diode to one output terminal and the other lead is connected to one storage capacitor. The second silicon control rectifier of the firing circuit is normally nonconductive. When the firing switch is closed, the power input is disconnected from the charging circuit and the shorting bar is removed from the output terminals of the firing circuit. The fourth capacitor can now discharge to the gate of the second silicon control rectifier of the firing circuit. As a result, current is provided to the gate of the silicon control rectifier of the firing circuit making it conductive. The firing circuit is thereby closed allowing the first and second storage capacitors to discharge through the inductor and blocking diode into the blasting circuit.

The blasting machine described also contains a ready circuit which functions to indicate that the first and second capacitors are charged to the desired voltage. The ready circuit contains an indicating means which is responsive to current flow through the first silicon control rectifier which occurs only when the first and second capacitors are fully charged. A representative ready circuit comprises a gas filled glow tube connected to the anode of the first silicon control rectifier. The first silicon control rectifier is made conductive when the voltage buildup on the third capacitor exceeds the breakdown voltage of the second voltage control means and a voltage is applied to the gate of the first silicon control rectifier. When this condition exists the first and second capacitors have been charged to the desired firing voltage and the glow tube lights indicating a ready condition.

A fail circuit also forms a part of the blasting machine of this invention and comprises a means responsive to current flow through the second silicon control rectifier during a charging sequence which indicates faulty operation of the second silicon control rectifier. A representative fail circuit comprises a glow tube, current limit resistor and blocking diode connected in series. One lead of the glow tube is connected at the junction of the second silicon control rectifier and blocking diode of the firing circuit and one lead of the blocking diode is connected into the charging circuit. During a capacitor charging sequence the glow tube will light upon closing of the charge switch if the second silicon control rectifier is faulty due to an internal short. The resistor in series with the glow tube limits the current flow therethrough and the blocking diode prevents discharge of the first and second storage capacitors into the charging circuit.

Having generally described the invention, an embodiment thereof will be described in accordance with the attached drawing.

Referring now to the drawing in detail, a fire switch (B) has four sets of contacts: 1, 2 and 3, 4 and 17, 18 and 19, 20. This switch is maintained in its normal or open position by a spring, and in this open position connects contacts 1, 2 and 17, 18. In the closed or operative position, the fire switch (B) connects contacts 3, 4 and 19, 20. A charge switch (A) is provided with contacts 9, 10 and 11, 12 and 13, 14 and 15, 16 and 5, 6 and 7, 8. The charge switch (A) is maintained in its normal or open position by a spring and in this open position connects contacts 9, 10, and 13, 14 and 5, 6. In the closed or operative position, charge switch (A) connects contacts 11, 12 and 15, 16 and 7, 8. The primary coil of transformer 21 (voltage multiplying means) is connected to contacts 12 and 16 of charge switch (A). Contact 11 of the charge switch A is connected to contact 2 of the fire switch B. An input power source (110 volts A.C.) is connected to contact 1 of switch B and contact 15 of switch A. A step-up transformer 21 is used as a full wave voltage doubler. Terminal 22 of transformer 21 is connected to anode of diode 25 and cathode of diode 26 through a surge protection resistor 24. Terminal 23 is connected to the center connection 62 of the series storage capacitors 28 and 29. Voltage divider resistors 30 and 31 are connected across capacitors 28 and 29, respectively. A resistor 32 is connected across the storage capacitors 28, 29 from terminal 63 to terminal 61 through normal close contacts 9 and 10 of the charge switch A as shown. This resistor provides a discharge path for the storage capacitors 28 and 29 when the machine is not in use. The cathode of diode 25 is connected to terminal 60 through a current limit resistor 27, and to terminal 68 through series connection of blocking diode 53, current limit resistor 54 and the fail neon lamp 55. Four Zener diodes 33a, 33b, 33c and 33d comprising the first voltage control circuit are connected in series to terminals 60 and 63 and to anode of diode 26. The Zener diode string 33a, b, c, d breakdown voltage determines the voltage to which the storage capacitors 28 and 29 are charged. Terminal 65 is connected to terminal 64 through resistor 34, to terminal 63 through capacitor 35 and to terminal 66 through Zener diode 36. Terminal 66 is connected to the gate lead of a first silicon control rectifier 39 through blocking diode 38 and to terminal 63 through resistor 37. Terminal 67 connects the anode lead of silicon control rectifier 39 to terminal 60 through resistor 42 and through series connection of resistor 41 and ready neon lamp 40. The cathode of the first silicon control rectifier 39 is connected to terminal 63 through resistor 43 and to contacts 5 and 7 of charge switch A through series connection of resistor 44 and diode 45. Contacts 5 and 7 of charge switch A are connected to terminal 63 through a capacitor 46 and the normally closed contacts 5, 6 of charge switch A and bleeder resistor 47. The gate lead of a second silicon control rectifier 50 is connected to terminal 63 through resistor 49 and to normally open contact 3 of fire switch B through resistor 48. Contact 4 of normally open fire switch B is connected to normally open contact 8 of charge switch A. The cathode of the second silicon control rectifier 50 is connected to the negative plate of capacitor 29 and in turn to terminal 63. The anode of the second silicon control rectifier 50 is connected to terminal 68, to the cathode of diode 51 and also to output terminal 58 via the diode 51. Inductor 52 is connected between output terminal 57 and the positive plate of capacitor 28 and terminal 61. The output terminals 57 and 58 are respectively shunted by normally closed contacts 17 and 18 of fire switch B when the machine is not in use.

OPERATION OF THE BLASTING MACHINE

The charging circuit has a charging switch A having contacts 5, 6, 7, 8, 9, 10, 11, 12, 15 and 16. The switch A in its normal open position (prior to charging) leaves contacts 7, 8, 11, 12, 15 and 16 open. In this position the charging circuit is isolated from the power source. Contacts 5, 6 and 9, 10 are normally closed. To charge the capacitors of the blasting machine switch A is closed. In the switch closed position contacts 5, 6 and 9, 10 are opened, and contacts 7, 8, 11, 12, 15 and 16 are closed. In closed position charging circuit A is operative. Contacts 11, 12, 15 and 16 connect the circuit through contacts 1, 2 of switch B to a 110 volt A.C. power source and through the secondary coil of step-up transformer 21 to the remainder of the circuit. The simultaneous opening of contacts 9 and 10 removes bleeder resistor 32 from capacitors 28 and 29 and opening of contacts 5 and 6 removes bleeder resistor 47 from capacitor 46 by the break-before-make action of switch A. The capacitors 28 and 29 are now ready to be charged. Contacts 7 and 8 are also closed and connect capacitor 46 to fire switch (B)—contact 4.

The stepped up alternating voltage produced across terminals 22 and 23 of the secondary coil of transformer 21 is applied to capacitors 28 and 29 by a voltage doubler circuit which comprises a part of the charging circuit. When the voltage output from secondary coil of transformer 21 is such that terminal 22 is at a positive potential with respect to terminal 23, a current will flow through surge limit resistor 24, rectifier diode 25, current limit resistor 27 and blocking diode 56 thereby positively charging capacitor 28. Terminal 61 is thereby made positive with respect to terminal 62. When the voltage output from the secondary coil of transformer 21 is such that terminal 22 is at a negative potential with respect to terminal 23 (next half cycle) rectifier diode 25 is nonconductive, and output current flows through rectifier diode 26 and negatively charges capacitor 29. Terminal 63 is made negative with respect to terminal 62. The potential difference between terminals 61 and 63 is therefore twice the peak voltage from the secondary coil of transformer 21. The rate at which the potential difference between terminals 61 and 63 is accumulated is determined by current limit resistor 27. Connected across each of capacitors 28 and 29 are resistors 30 and 31 respectively. These resistors function as voltage dividers and maintain equal voltage potential across the storage capacitors during charging.

The voltage to which the capacitors 28 and 29 are charged during a charging sequence is controlled by connecting in parallel with the capacitors first voltage control means such as a series of Zener diodes. At least two Zener diodes are required. The Zener diodes are non-conducting until the voltage drop across the capacitors exceeds a predetermined level which is the breakdown voltage of the Zener diodes at which time the diodes become conducting but still maintain the breakdown voltage. Thus, the maximum voltage to which the capacitors can be charged is limited by the breakdown voltage of the Zener diodes. A terminal 64 is connected between Zener diodes 33c and 33d. As current passes through Zener diode 33c into Zener diode 33d the potential at terminal 64 is positive with respect to terminal 63. Current flows through Zener diode 33d and positively charges a third capacitor 35. Capacitor 35 is connected in series with a second voltage control means comprising Zener diode 36 which is connected in series to blocking diode 38 and to the gate of a first silicon control rectifier 39. When the positive voltage on the third capacitor 35 exceeds the breakdown voltage of Zener diode 36 sufficient current is applied at the gate of the first silicon control rectifier 39 through blocking diode 38, to make the first silicon control rectifier 39 conductive.

A ready circuit is connected to the anode of the first silicon control rectifier 39, said ready circuit indicating that the first and second capacitors (28, 29) are charged to the desired potential. The ready circuit is comprised of resistor 41 connected in series to neon lamp 40. A fourth capacitor 46 is connected to the cathode of the first silicon rectifier 39. A predetermined positive voltage is also placed on capacitor 46 beacuse of voltage divide resistors 42 and 43 connected to silicon control rectifier 39. Discharge of the firing voltage stored on capacitors 28 and 29 through the ready circuit and in particular through resistors 42, conductive silicon control rectifier 39, and resistor 43 is prevented by blocking diode 56. Blocking diode 51 prevents any current from flowing to terminal 61 and to the blasting caps connected to output terminals 57 and 58 through inductor 52 and contacts 17 and 18 of switch B by the fail circuit path during a charging operation.

When the capacitors 28 and 29 are charged as indicated by glow of ready neon lamp 40 the firing circuit can be energized by closing firing switch B. With closing of firing switch B the short circuit is removed from output terminals 57 and 58 by opening the connection between contacts 17 and 18. Connection between contacts 1 and 2 is opened thereby removing the input power source from the charging circuit. Following breaking of contacts 17, 18 and 1, 2 contact is made between contacts 3, 4 and 7, 8. Voltage is then transferred from the fourth capacitor 46 through resistor 48 to the gate of the second silicon control rectifier 50 making the silicon control rectifier conductive. With the second silicon control rectifier 50 conductive, the stored potential on capacitors 28 and 29 discharges through inductor 52 and diode 51 into the blasting circuit connected to output terminals 57 and 58.

Connected at the junction of silicon control rectifier 50 and blocking diode 51 is a fail circuit which is operative only when the silicon control rectifier is conductive. The circuit is comprised of a fail neon lamp 55, a current limit resistor 54 and a blocking diode 53. Neon lamp 55 will flicker during firing of blasting caps by the machine showing proper operation. Neon light 55 will glow instantaneously and continuously upon actuation of charge switch A due to faulty operation of the second silicon control rectifier 50 due to an internal short.

In the blasting machine heretofore described any number of capacitors connected in parallel can be substituted for either of capacitors 28 and 29. The power input to the blasting machine of this invention is an alternating current source preferably of 110 volts. Higher voltage power inputs, i.e. 220 volts and 440 volts, can be employed if desired.

The blasting machine of this invention provides the utmost in safety and reliability in condenser-type blasting machines. The charged storage capacitors can only be fired by actuation of both a charging switch and a firing switch. There is a short across the output terminals at all times except during actuation of the firing switch. Furthermore, insufficient firing voltage cannot be discharged to the blasting circuit causing a hazardous condition, due to the non-conductivity of the silicon control rectifier in the firing circuit if proper capacitor charge voltage has not been reached. The fail circuit provides instant indication of a faulty silicon control rectifier in the firing circuit.

What I claim and desire to protect by Letters Patent is:

1. A solid state blasting machine providing current to a blasting circuit for initiating electrical initiator in the blasting circuit, said machine having in combination
   (a) a charging circuit comprising an A.C. power input, a voltage multiplying means connected to the power input, a charging switch and a firing switch, the power input being connected to the charging switch when the charging switch is closed and the firing switch open, two semiconductor diodes of opposite conductivity each connected to an output lead of the voltage multiplying means, a first and second capacitor connected in series with the semiconductor diodes, each semiconductor being connected to one of the capacitors,
   (b) a first voltage control means connected in parallel with the first and second capacitors having a breakdown and holding voltage equal to the firing voltage desired in the blasting circuit and a third capacitor connected in series with the output from the first voltage control means,
   (c) a second voltage control means connected in series with the third capacitor,
   (d) a first silicon control rectifier connected through the gate thereof to the output from the second voltage control means,
   (e) a ready circuit comprising means responsive to current flow through the first silicon control rectifier for indicating charging of the first and second capacitor to the desired voltage,
   (f) a fourth capacitor connected to the cathode of the first silicon control rectifier,
   (g) a firing circuit, connected in parallel with the first and second capacitors through the open firing switch, said firing circuit comprising an inductor, output terminals connected to the blasting circuit, shorting means connected across said output terminals, a second silicon control rectifier and blocking diode connected in series, said firing circuit being connected through the gate of the second silicon control rectifier to the fourth capacitor, and
   (h) a fail circuit comprising means responsive to current flow through the second silicon control rectifier during charging for indicating faulty operation of the second silicon control rectifier, the first and second capacitors of said charging circuit being charged when the charging switch is closed, said charged capacitors discharging through the firing circuit into the blasting circuit by closing the firing switch whereby the power input is disconnected from the charging circuit, the shorting means is removed from the output terminals of the firing circuit, and the fourth capacitor discharges through the closed firing switch into the gate of the second silicon control rectifier making it conductive, permitting current to flow from the first and second capacitors through the firing circuit into the blasting circuit.

2. The blasting machine of claim 1 in which the first and second voltage control means are comprised of Zener diodes.

3. The blasting machine of claim 2 wherein the indicating means of the ready circuit comprises a glow tube and resistor connected in series, said glow tube being connected to the anode of the first silicon control rectifier and the resistor being connected to the output of a semiconductor diode in the charging circuit.

4. The blasting machine of claim 3 wherein the fail circuit is comprised of a glow tube, current limit resistor and blocking diode connected in series, said glow tube being connected at the junction of the second silicon control rectifier and blocking diode in the firing circuit and the blocking diode being connected to the output of a semiconductor diode in the charging circuit.

References Cited
UNITED STATES PATENTS

| | | | |
|---|---|---|---|
| 3,312,869 | 4/1967 | Werner | 317—80 |
| 3,409,804 | 11/1968 | Bankston | 317—80 |
| 3,417,306 | 12/1968 | Knak | 320—1 |
| 3,439,616 | 4/1969 | Godsey et al. | 102—70.2 |
| 3,470,419 | 9/1969 | Sitler et al. | 317—80 |

VOLODYMYR Y. MAYEWSKY, Primary Examiner

U.S. Cl. X.R.

102—70.2; 320—1; 323—77